(No Model.)
J. F. BIBLE.
WHEEL AND AXLE CONNECTION.
No. 570,742. Patented Nov. 3, 1896.
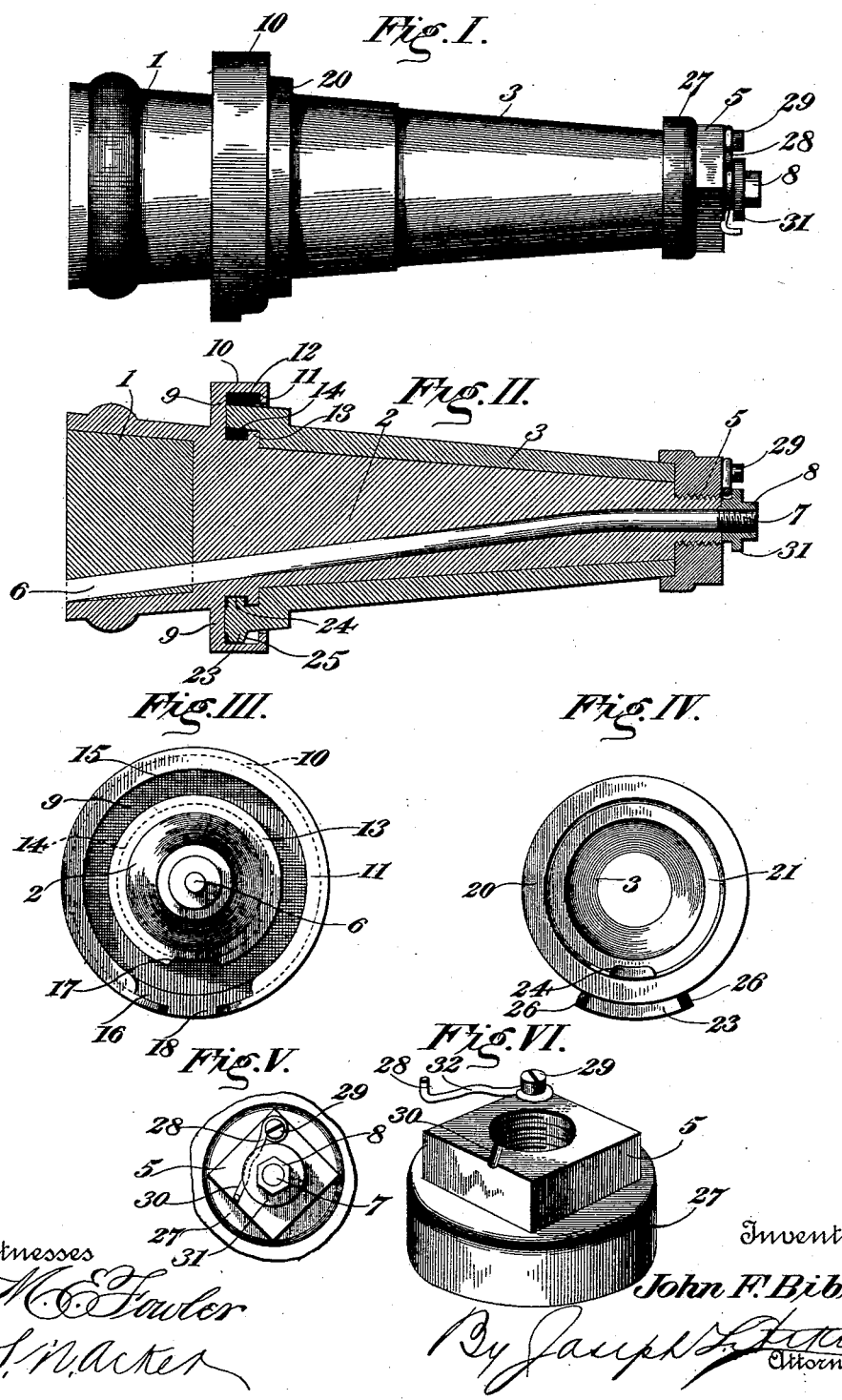
Witnesses
M. E. Fowler
S. N. Acker
Inventor
John F. Bible,
By Joseph L. Atkins
Attorney.

UNITED STATES PATENT OFFICE.

JOHN F. BIBLE, OF IONIA, MICHIGAN.

WHEEL AND AXLE CONNECTION.

SPECIFICATION forming part of Letters Patent No. 570,742, dated November 3, 1896.

Application filed June 24, 1896. Serial No. 596,713. (No model.)

*To all whom it may concern:*

Be it known that I, JOHN F. BIBLE, of Ionia, in the county of Ionia, State of Michigan, have invented certain new and useful Improvements in Wheel and Axle Connections, of which the following is a complete specification, reference being had to the accompanying drawings.

The object of my invention is to produce an improved device for attaching a wheel-hub and especially a thimble-skein to an axle by means which perform also the additional office of protecting the axle and the interior of the thimble-skein, at each end of the latter, from dust or the like.

In the accompanying drawings, Figure I is a side elevation of an axle and thimble-skein equipped with my invention, showing the axle in the position which it occupies in use. Fig. II is a central longitudinal section of the same. Fig. III is an end view of the spindle with the thimble skein or box detached. Fig. IV is an inner end view of the thimble skein or box. Fig. V is an end view of a portion of the subject-matter of Fig. I, illustrating the nut in the locked position. Fig. VI is a perspective view of the nut detached.

Referring to the figures on the drawings, 1 indicates the section of an axle, and 2 the spindle thereof, which is fitted to and directly carries the thimble-skein 3. The spindle terminates in a screw-threaded extremity that carries a nut 5. The axle is preferably, but not necessarily, provided with a truss-rod 6, which extends its entire length and terminates in a screw-threaded extremity 7, that carries a lock-nut 8.

The axle is provided at the inner end of its tapered extremity 2 with a transverse annular flange 9, from which extends in the direction of the nut 4 a band-like flange 10, that carries a second transverse flange 11. The flanges 9, 10, and 11 define between them an inwardly-opening annular groove 12. In the same plane with the flange 11 and opposite to it is an annular flange 13, which defines between it and the flange 9 a groove 14 opposite to the groove 10 and between its outer periphery and the inner periphery of the flange 11 an annular opening 15. Preferably in its lower part, that is, upon the lower side of the axle, the flange 11 is cut away, as indicated at 16, and opposite to it the flange 13 is cut away, as indicated at 17. Coincident with the cut-away portion of the flange is a discharge-opening 18, formed by removing a portion of the flange 10.

The inner end of the thimble skein or box is provided with an annular boss 20, that is slightly flared or tapered proportionately to and in the direction of the taper of the thimble-skein proper. It defines upon the thimble skein or box a shoulder 21, which, when the parts are united, revolves against the face of the flange 13, while the edge 22 of the boss 20 revolves against the flange 9. Upon one side, near the edge of the boss, I provide an oblong lug 23, which fits snugly within the cut-away portion 16 of the flange 11. Opposite to the lug 23 upon the inner wall of the boss 20 I provide a lug 24, which fits snugly in the cut-away portion 17 of the flange 13.

In uniting the thimble skein or box to the spindle the former is slipped in position so as to bring the lugs 23 and 24, respectively, opposite the cut-away portions 16 and 17, when the thimble-skein can be slipped completely in place, in which position the lug 23 revolves within the groove 12, which it fits loosely, and the lug 24 revolves in like manner in the groove 14. In practice therefore in order to permit the separation of the thimble skein or box from the spindle it is necessary that the lugs 23 and 24, respectively, shall come into perfect alinement with the cut-away portions 16 and 17. Consequently, as has been demonstrated, it is practically impossible for the parts to become accidentally separated.

To more thoroughly insure against the accidental separation of the thimble skein or box from the axle, I prefer to make the lug 23 slightly beveled in cross-section, as indicated at 25, and to make the ends 26 of the lug 23 slightly wedge-shaped. By reason of that construction the tendency of the lug upon the thimble-skein is always to pass under the edge of the flange 11, instead of stopping opposite to its cut-away portion 16.

In addition to their office of uniting the thimble skein or box to the axle the several flanges 9, 10, and 11 and the flange 13, coöperating with the boss 20, with its lugs 23 and 24, constitute an effective guard against the intrusion of sand, dust, grit, or the like, at the same time producing a tendency to prevent the escape of grease, oil, or the like from the spindle. Should any deleterious material gain entrance to the groove 12, its lug 23, working therein, will act as a sweep to force it entirely around the groove toward the opening 18, where it is discharged.

The efficiency of the mechanism above described for uniting the thimble-skein to the thimble is such as to permit the employment of any ordinary nut upon the screw-threaded extremity 4 of the spindle. I prefer, however, to provide upon the inner side of the nut 5 a cup-shaped flange 27, that fits over the end of the thimble skein or box and protects the spindle at that end from intrusion of sand, dust, or the like. I also prefer to provide upon the outer face of the nut a spring-latch 28, pivoted, as indicated at 29, so as to work across the face of the nut. In alinement with the latch I provide a notch or groove 30, within which the latch is adapted to spring, and which serves to hold it in a fixed position until manually released. When the nut 5 is screwed into place and the latch is fastened in its notch 30, the latch slips behind the flange 31 of the lock-nut 8, and is preferably provided with a bend 32 to fit the exposed surface of the lock-nut 8 behind the flange 31. In the position described the lock 8 effectually prevents the release of the nut 5 until the latch is sufficiently turned upon its pivot to escape engagement with the flange 31.

As above stated, I prefer to employ a truss-rod 6 for carrying the nut; but that is not essential, since an ordinary lag-nut or other similar contrivance screwing into the end of the spindle may be substituted for that purpose.

What I claim is—

1. The combination with an axle and plurality of retaining-grooves thereon, and openings into each, respectively, of a thimble-skein and lugs thereon, fitted to and adapted to enter the openings into the respective grooves upon the axle, substantially as set forth.

2. The combination with an axle and flanges thereon defining opposite grooves, of a thimble-skein provided with lug-sweeps upon its opposite sides adapted to enter, respectively, the grooves upon the axle, substantially as set forth.

3. The combination with an axle, flange-defined groove, an opening into the groove, and dust-discharge opening coincident therewith, of a thimble skein or box and lug upon the same adapted to enter the opening in the groove and working in the groove to constitute a sweep for discharging dust toward the discharge-opening, substantially as set forth.

4. The combination with a spindle and lock-nut, of a nut adapted to be secured to the end of the spindle, a latch working across the face of the nut and adapted to engage with the lock-nut, and means for securing the latch in engagement with the lock-nut, substantially as set forth.

5. The combination with a spindle, truss and lock-nut on the end of the truss, of a nut screwing upon the end of the spindle, a latch pivoted upon the face of the nut, and adapted to engage with the lock-nut, and means for securing the latch in engagement with the lock-nut, substantially as set forth.

In testimony of all which I have hereunto subscribed my name.

JOHN F. BIBLE.

Witnesses:
  JOHN B. CHADDOCK,
  JAMES SCULLY.